March 3, 1953 C. JOHNSON 2,630,135
FLUID DISTRIBUTING VALVE
Original Filed June 17, 1943
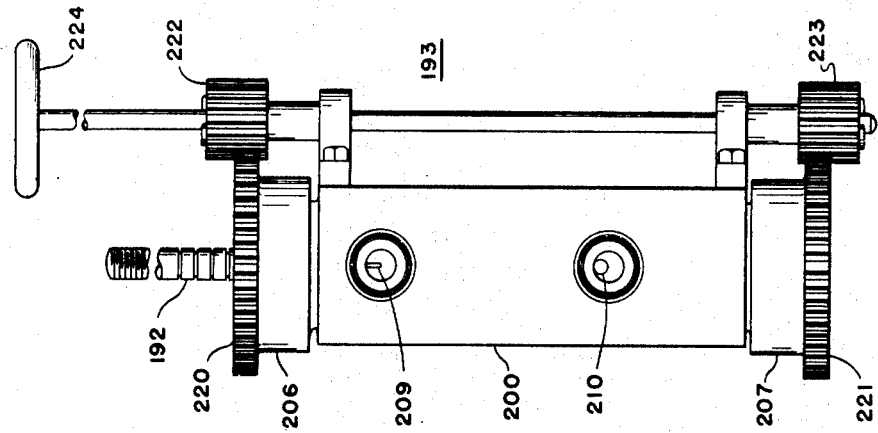
FIG. 4
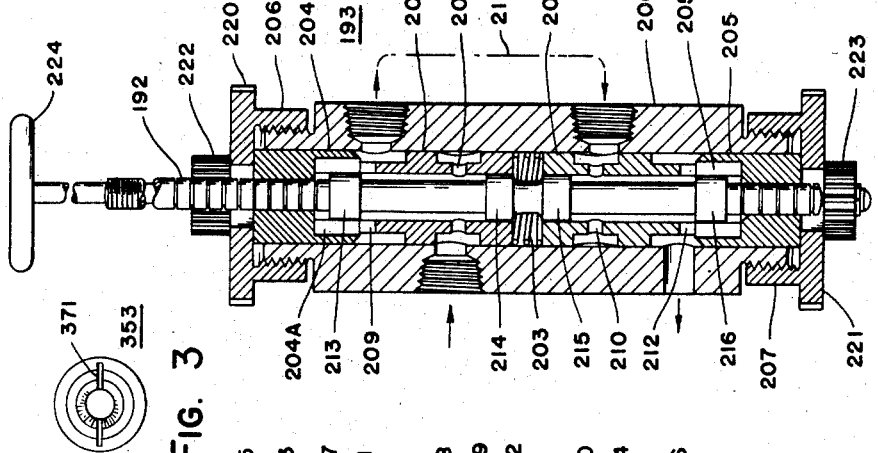
FIG. 5
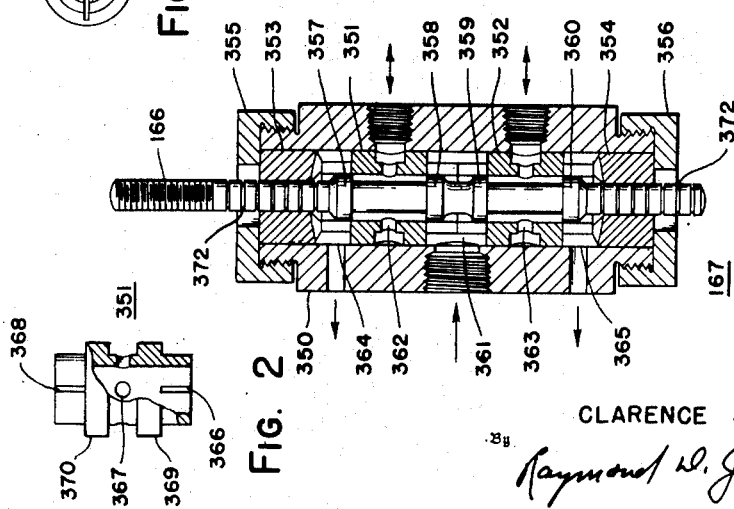
FIG. 3
FIG. 2
FIG. 1
Inventor
CLARENCE JOHNSON
By Raymond D. Junkins
Attorney

Patented Mar. 3, 1953

2,630,135

UNITED STATES PATENT OFFICE 2,630,135

FLUID DISTRIBUTING VALVE

Clarence Johnson, South Euclid, Ohio, assignor to Bailey Meter Company, a corporation of Delaware Application June 17, 1943, Serial No. 491,162, now Patent No. 2,399,806, dated May 7, 1946, which is a division of application Serial No. 384,375, March 20, 1941, now Patent No. 2,372,426, dated March 27, 1945. Divided and this application January 19, 1946, Serial No. 642,175

3 Claims. (Cl. 137—622)

This invention relates to the construction of fluid control valves, and more particularly to the construction of fluid pilot valves and fluid resistance valves.

An object of the invention is to provide a fluid control valve which has a self-balancing feature due to the dimensioning of the lands and ports.

Another object of the invention is to provide a fluid control valve body with an adjustable sleeve therein which in turn contains the movable spool of the valve and wherein the sleeve is axially adjustable by means of threaded end caps.

Still another object of the invention is to provide a fluid control valve having an axially movable spool with cylindrical bearing portions of a greater length than diameter and wherein these bearing portions have a plurality of annular grooves or cannelures which help to reduce friction and to eliminate side thrust on the movable spool.

Still another object of the invention is to provide a fluid control valve wherein a movable spool has lands which are of smaller diameter than the cylindrical passageway of the bore of the valve so that the only bearing surface is at the true bearings of the valve, thus reducing the friction of the valve.

Other objects and a fuller understanding of the invention may be had by referring to the following description and claims, taken in conjunction with the accompanying drawings, in which:

Figure 1 is a cross-sectional view of one form of pilot valve employed in the power unit;

Figure 2 is an elevation view of a sleeve element of the pilot valve shown in Figure 1;

Figure 3 is an end view of a bearing element of the pilot valve shown in Figure 1;

Figure 4 is an elevation view and Figure 5 is a cross-section view of a type of resistance valve which may be incorporated in the power unit.

In Fig. 1 I show a pilot valve 167 in cross-section. A body member 350 has a cylindrical bore in which are disposed sleeves 351, 352 and bearing members 353, 354. Caps 355 and 356 screwed to the body 350 hold the sleeves and bearing members in position. The movable valve member 166 is provided with lands 357, 358, 359 and 360 of slightly less diameter than the bore in sleeves 351, 352. Lands 358, 359 control the flow of hydraulic fluid from an inlet port 361 to outlet ports 362, 363. These outlet ports may, respectively, be connected to a servo-motor as shown in my parent application, Patent No. 2,399,806, issued May 7, 1946. Lands 357, 360 control the flow of hydraulic fluid from outlet ports 362, 363 to waste ports 364, 365 respectively. Downward movement of the valve member 166 from the neutral position in which it is shown opens inlet port 361 to outlet port 362 and permits the passage of hydraulic fluid therebetween. Such movement also opens outlet port 363 to waste port 365 so that as a result of such downward positioning of the valve member 166 hydraulic fluid is admitted to the servo-motor connected to the ports 362 and 363 on one side of the piston and discharged from the other side. Conversely, upward positioning of the movable valve member 166 opens outlet port 363 to inlet port 361, and simultaneously opens outlet port 362 to exhaust port 364. Thus downward positioning of the movable valve member 166 from the neutral position effects operation of the servo-motor piston in one direction, whereas upward positioning effects operation of the servo-motor piston in the opposite direction.

Sleeve 351 which is identical with sleeve 352 is shown partially broken away in Fig. 2. The inlet port 361 consists of a slot 366, whereas the outlet port 362 consists of a plurality of circumferentially spaced holes 367. The waste port is similar to the inlet port 366 and comprises a slot 368. The sleeve is also provided with spaced collars 369, 370 serving to properly align the sleeve in the housing 350 and acting to separate the inlet port from the outlet port and the outlet port from the waste port.

In Fig. 3 I show an end view of the bearing member 353, and bearing member 354 being identical therewith. As shown, the end of bearing member 353 adjacent the sleeve 351 is conically recessed and provided with a radial slot 371 which acts to prevent land 357 adhering to the bearing member if positioned upwardly thereagainst.

The pilot valve 167 is inherently stable as a displacement of the valve member 166 from neutral position with consequent flow of hydraulic fluid and produces a slight reaction tending to return the movable valve member to the neutral position. That such reaction exists will be evident from an inspection of the construction shown in Fig. 1 for upon a displacement of the member 166 from neutral position the sole unbalanced force is that in the waste port 364 or 365. This stabilizing reaction may be brought to any value desired by proper design of the waste ports.

Assume a slight downward movement of the valve member 166. A portion of the lower slot 366 of sleeve 351 is uncovered by land 358 allowing oil to pass from inlet 361 to outlet 362. The reaction area upon which this oil acts is balanced being the upper area of land 358 and the equivalent lower area of land 357.

At the same time a portion of the lower slot 366 of sleeve 352 is uncovered by land 360 allowing oil to pass from outlet 363 to waste passage 365. The reaction area between the lands 359 and 360 is balanced. However, the waste passage 365 (as well as 364) is purposely restricted as compared to 361, 362, 363 so that some of the oil passing from 363 through slot 366, around land 360, will be effective below land 360 on the under beveled face thereof tending to move stem 166 upwardly, i. e., the oil pressure acting upon the lower beveled face of land 360 is unbalanced and produces a reaction tending to return the valve stem 166 to its neutral position.

Conversely, an upward positioning of the valve member 166 will result in an unbalanced stabilizing reaction tending to return the member to neutral position. The result is an extremely stable construction in contra-distinction to known pilot valves which, when moved out of neutral position, tend to move further away with resulting chattering and vibration as they seek a state of equilibrium.

Also by having the valve member 166 journaled in bearing members 353, 354 it is possible to have the lands 357, 358, 359 and 360 of slightly less diameter than the bore through sleeves 351 and 352, thereby reducing friction to a minimum. In other words, the clearance of member 166 where it passes through bearing pieces 353, 354 is materially less than the clearance of lands 357, 358, 359, 360 in sleeves 351 and 352. This means that it is only necessary to align and size two bearing surfaces rather than six in line. Furthermore, the fit of the member 166 in bearing pieces 353, 354 may be much closer (minimizing oil leakage) than would otherwise be possible. Any slight amount of oil leakage past the lands, due to the excess clearance, is not harmful. Leakage past lands 358 and 359 will be the same to opposite sides of the power cylinder until equilibrium is reached and thereafter will continue on past lands 357 and 360 to waste equally.

Further, to reduce friction the sections of the movable valve member 166, journaled in bearing members 353 and 354, are provided with a plurality of cancelures or grooves 372, thereby preventing pressure building up on one side of the valve member and producing lateral thrust. Such grooves also reduce the leakage which otherwise would exist between the interior and exterior of the pilot valve. The oil used is usually under around 300 p. s. i. pressure and even well fitted bearings 166—353 and 166—354 will tend to develop some leakage. I have found a tendency for the movable member to be crowded to one side, thus placing substantially all of the clearance on the other side. Oil starts to leak through this enlarged clearance; the other side of the bearing becomes practically dry, and the increased friction and capillary drag considerably affect the positioning and accuracy of the pilot.

By providing a bearing length of several times the diameter and with a number of grooves 372 I provide a substantially frictionless, well lubricated bearing. Such oil grooves prevent the stem from hugging and sticking to one side of the bearing and result in a uniform lubricating film being continuously applied to the bearing surfaces. They effectively prevent lateral thrust caused by oil leaking past one side of the movable member.

In Figs. 4 and 5 I show the pilot valve or resistance valve 193 in greater detail and to larger size. A housing 200 has a longitudinal passageway in which are disposed identical sleeves 201, 202 urged by a spring 203 against bearing members 204 and 205. Caps 206, 207 screw-threaded to the body 193 take the end thrust of the bearing members. Oil exhausted from a servo-motor, such as the servo-motor 152 of my parent application, enters an initial inlet port 208, passes axially upwardly through an intermediate outlet port 209, whence it is transmitted to an intermediate inlet port 210 through a suitable connection (diagrammatically shown) 211, and thence axially downwardly to a final outlet port 212 from which it is exhausted into the oil reservoir.

Within the passageway is disposed the movable valve member 192 having lands 213, 214, 215 and 216. In the position shown the resistance to fluid flow through the port 209 is at a minimum, as is that through the port 212. Upon the valve member 192 moving downwardly, the resistance to fluid flow through the outlet port 209 will increase inasmuch as the land 213 will partially close it. This increase in resistance will decrease the flow of fluid from the servo-motor 152, thereby decreasing the rate of travel of the servo-motor piston. If the land 213 completely covers the port 209 the servo-motor piston will completely stop. Likewise upward movement of the movable valve member 192 from the position shown will cause the land 216 to partially or wholly cover the port 212, thereby increasing the resistance to fluid flow and slowing down or stopping the servo-motor piston.

The inlet ports 208 and 210 comprise a plurality of circumferentially spaced holes in the sleeves 201 and 202 respectively. The sleeves are recessed adjacent these ports so that oil flows into the passageway formed by the sleeves through all of the holes simultaneously. The outlet ports 209, 212 are formed by end slots in the sleeves 201 and 202. Bearing members 204, 205 are provided with one or more slots 204A, 205A which act to equalize the pressures on opposite sides of lands 213, 213. Slots 204A, 205A having a small area offer a high resistance to the flow of oil.

As will be appreciated by those familiar with the fluid servo-motor art, it is desirable to have the maximum rate of travel of the servo-motor piston adjustable. Accordingly, I provide the pilot valve 193 with a means for adjusting the minimum resistance to fluid flow. This I accomplish by providing the caps 206 and 207 with opposite threads, so that as they are rotated in the same direction one will move downwardly and the other upwardly. Such positioning will move the bearing members 204, 205 toward or away from each other, causing sleeve members 201 and 202 to likewise move toward or away from each other. Such positioning of the sleeve members will cause the movable valve member 192 to increase or decrease the effective free area of the ports 209, 212 when in the neutral position or that position obtaining when normal distance exists between the nozzle 187 and feeler 158. Conveniently such adjustment may be obtained by providing the caps 206 and 207 with gears 220, 221 meshing with pinions 222, 223 manually rotatable by means of knob 224.

This application is a division of my copending application Serial Number 491,162, now Patent Number 2,399,806, issued May 7, 1946, which was filed on June 17, 1943, as a division of my application filed March 20, 1941, which resulted in Patent Number 2,372,426, issued March 27, 1945.

While in accordance with the patent statutes I have described certain embodiments of my invention it is evident that such embodiments may be modified in many ways without departing from the spirit and scope of the invention. Such embodiments of my invention as I have chosen to describe should therefore be taken as merely illustrative and not as limiting.

What I claim as new, and desire to secure by Letters Patent of the United States, is:

1. A fluid pilot valve comprising a cylindrical chamber having two spaced outlet ports, an inlet port located between said outlet ports and a waste port located beyond each of said outlet ports, and a movable valve member positionable axially in said body member, said valve member provided with a land normally disposed on either side of said inlet port to prevent the flow of pressure fluid therefrom to either of said outlet ports, said valve member also provided with a land normally disposed adjacent each of said waste ports to prevent flow of pressure fluid thereto, the relative dimensions of the ports and lands such that when the valve member is moved from neutral position an unbalanced fluid pressure is effective upon one of the lands tending to return the valve member to neutral axial position, the relative diameters of said chamber and valve member being such that a substantially greater clearance exists between said cylindrical valve member and said cylindrical chamber than exists between said journal surfaces to thereby permit bleeding of hydraulic fluid past said valve member and to substantially eliminate any leakage of fluid through said journals.

2. A fluid valve comprising a body member having first and second ends and a cylindrical passageway therethrough, first and second inlet ports and first and second outlet ports in said body member, a valve member disposed in said cylindrical passageway, a cylindrical end portion on each end of said valve member for forming a first bearing surface of a length greater than the diameter thereof, said cylindrical end portions having a diameter less than the diameter of said cylindrical passageway, a closure member in each end of said body member and having a cylindrical opening therethrough forming a second bearing surface for journaling the first bearing surfaces of said valve member therein, first and second caps engaging said first and second ends of said body member for holding said closure members in place, and a plurality of lands on said valve member for variably restricting the flow of fluid through said fluid valve for various axial positions of said valve member, said first outlet port being adjacent one of said closure members, said valve member having a valve portion adjacent to and of greater diameter than the bearing surface in said one of said closure members, said first outlet port having a restricted opening connected to only one outlet to present a fluid resistance to raise the fluid pressure in said valve body between said valve portion and said one closure member whereby the fluid under pressure in the space between said valve portion and said one closure member effects a thrust tending to axially displace said valve member away from said one closure member.

3. A fluid valve as claimed in claim 2 wherein means are provided for effectively connecting two of said ports in series.

CLARENCE JOHNSON.

REFERENCES CITED

The following references are of record in the file of this patent:

UNITED STATES PATENTS

| Number | Name | Date |
|---|---|---|
| 525,462 | Jones | Sept. 4, 1894 |
| 558,825 | Mathis | Apr. 21, 1896 |
| 1,343,024 | Bark | June 8, 1920 |
| 1,560,771 | Feichter | Nov. 10, 1925 |
| 1,820,653 | Ernst | Aug. 25, 1931 |
| 1,937,077 | West | Nov. 28, 1933 |
| 2,055,530 | Hallenbeck | Sept. 29, 1936 |
| 2,370,076 | Rosenberger | Feb. 20, 1943 |
| 2,381,501 | Knutzen | Aug. 7, 1945 |